United States Patent [19]

de Carbon

[11] 3,885,777
[45] May 27, 1975

[54] LEVEL CORRECTOR FOR SHOCK ABSORBERS

[76] Inventor: Christian Bourcier de Carbon, 64, Boulevard Maurice-Barres, 92-Neuilly-Sur-Seine, France

[22] Filed: Dec. 29, 1972

[21] Appl. No.: 319,659

Related U.S. Application Data

[63] Continuation of Ser. No. 83,707, Oct. 26, 1970, abandoned.

[30] Foreign Application Priority Data

Oct. 29, 1969 France .............................. 69.37113

[52] U.S. Cl. ............................................. 267/64 R
[51] Int. Cl. ............................................. F16f 5/00
[58] Field of Search ......... 267/64 R, DIG. 1, DIG. 2

[56] References Cited
UNITED STATES PATENTS 2,957,702   10/1960   Heiss ................................ 267/64 R
3,589,702   6/1971    Spieth ............................... 267/64 R Primary Examiner—James B. Marbert
Attorney, Agent, or Firm—Watson, Cole, Grindle & Watson

[57] ABSTRACT

This invention relates to a hydropneumatic spring device comprising an oleopneumatic shock absorber having a cylinder and a reciprocable damping piston therein, a rod on the piston extending outwardly of the cylinder through a packed opening at one end of the cylinder. The cylinder has also a quantity of damping liquid separated by partition from a quantity of compressible gaseous fluid. The cylinder also has a control piston and means for adjusting the position of the control piston to vary the pressure on the damping liquid and gaseous fluid.

5 Claims, 2 Drawing Figures

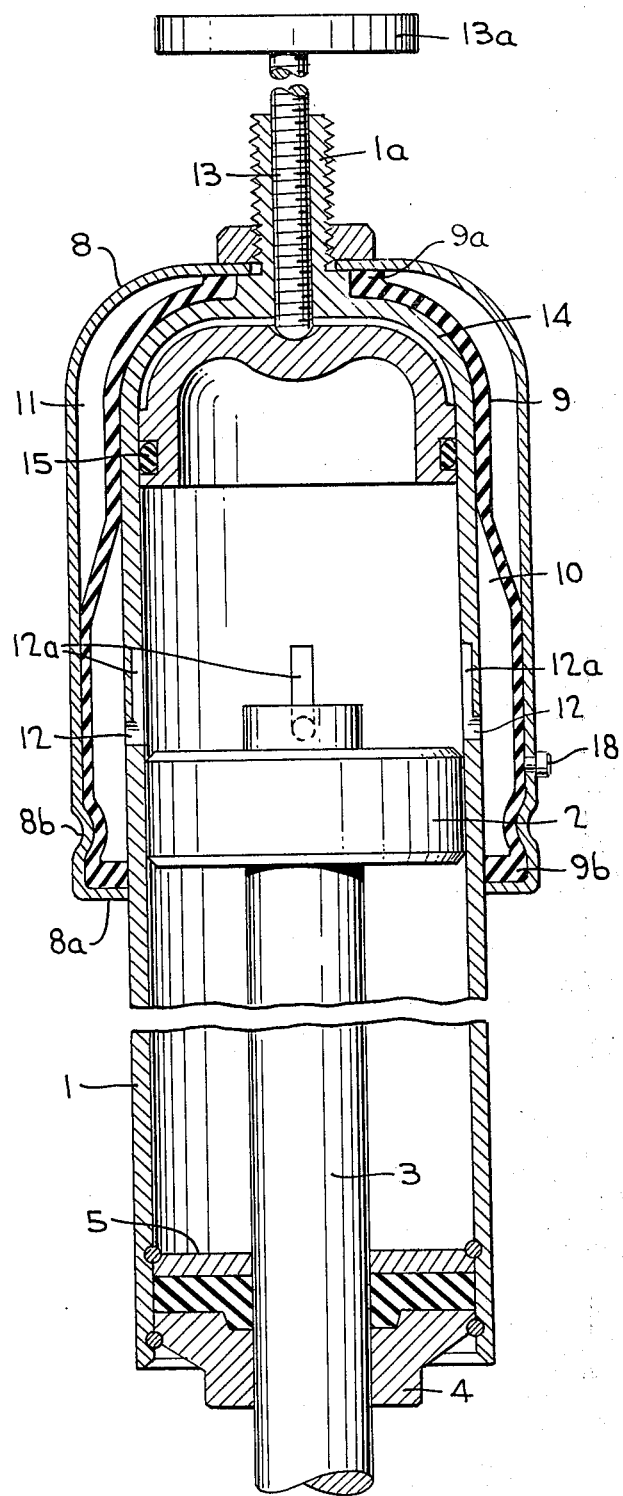
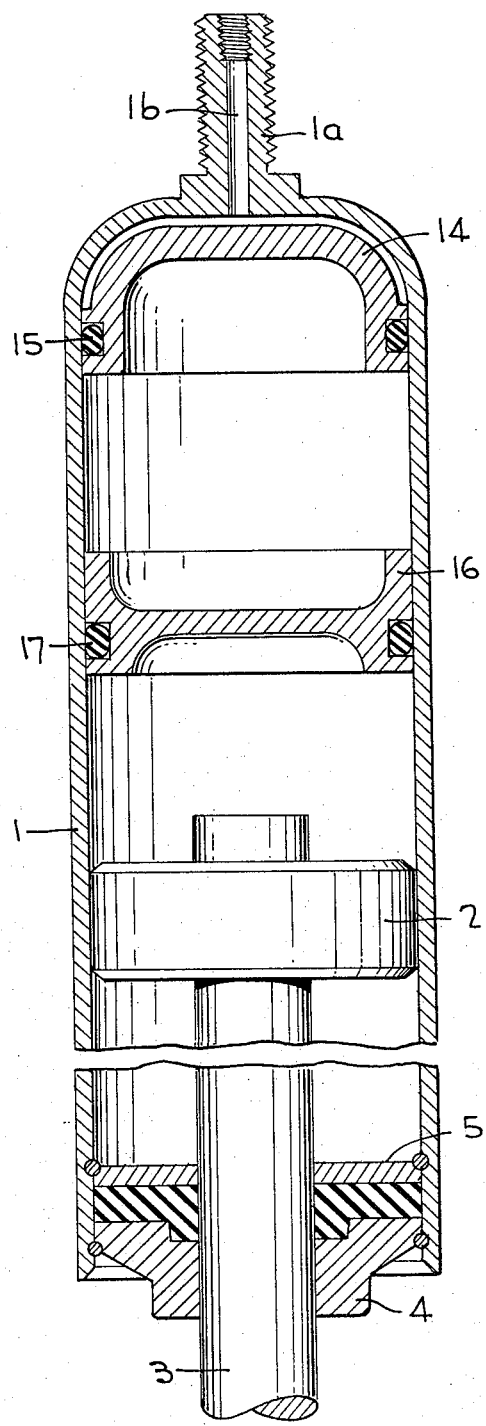

LEVEL CORRECTOR FOR SHOCK ABSORBERS

This is a continuation of application Ser. No. 83,707, filed Oct. 26, 1970 now abandoned.

The present invention relates to a device for correcting the level of vehicles provided with oleopneumatic shock absorbers.

The problem of correcting the level, i.e., maintaining the road clearance of a vehicle at a fairly constant value, regardless of the load of the vehicle, is more and more of a concern, particularly for designers of particular vehicles. Actually, to increase the comfort of these vehicles, more and more flexible suspensions have been used, but this has resulted in a great variation of the road clearance and also often in a more or less great variation in the tilt of the lengthwise axis of the vehicle. These variations can modify the road behavior of the vehicle on the one hand, and affect the adjustment of the headlights on the other hand.

Numerous solutions to this problem have been proposed or realized, either by providing a pneumatic or oleopneumatic suspension with an automatic level correction, or by providing shock absorbers which comprise a pump operated by the movement of the shock absorber to put under pressure a compensation chamber which makes it possible to find again the original road clearance after a rather considerable shaft of the vehicle.

The most notable drawback of these systems is that they are very complicated and expensive and their maintenance is not easy and that the pumping operation disturbs the riding comfort.

Making the elements of a standard suspension adjustable has already been thought of. Although technically this is easily done and with not too much cost, positioning of the suspension is an operation to be performed by a mechanic with losses of time, etc., which result therefrom so that in general, owners of vehicles with such a device do not use it.

The present invention aims at avoiding these drawbacks and it has for its object a device for total or partial correction of the level, characterized by the fact that in an oleopneumatic shock absorber filled with liquid and gas under pressure, there is provided at the end opposite the outlet of the piston rod, a fluid-tight piston whose position in the shock absorber tube is controlled on the outside to compress more or less forcefully the gas in the shock absorber, thus creating a thrusting force of the rod of the shock absorber proportional to the pressure.

In developing the main inventive idea, it is provided that:

the fluid-tight piston is driven by a threaded rod turning in a threaded bore of the attachment head of the shock absorber, said threaded rod being provided with a serrated or embossed wheel or the like that can be turned by hand or with a wrench.

the fluid-tight piston is driven by a fluid under pressure.

the fluid-tight piston is mounted in an oleopneumatic monotube shock absorber comprising a floating separation piston between the liquid of the shock absorber and the gas under pressure.

the fluid-tight piston is mounted in an oleopneumatic monotube shock absorber comprising an elastomer sleeve capping a part of the shock absorber tube, said sleeve being held up by a rigid tube of greater diameter than the shock absorber tube, the volume determined by the space between the sleeve and shock absorber tube being connected with the inside of said tube, while the volume determined by the space between said sleeve and the tube which holds it up is filled with a gas under pressure.

the fluid-tight piston is mounted in an oleopneumatic monotube shock absorber constituting the front wheel fork or the suspension element of the back wheel of a motorcycle.

a metal suspension spring is arranged on the inside of a shock absorber forming the fork or suspension element of a motorcycle.

the gas under pressure of the oleopneumatic monotube shock absorber constitutes the elastic suspension element.

By way of example and to facilitate understanding of the following description, there are represented on the accompanying drawings:

FIG. 1, a hand operated level correction device according to a first embodiment according to the invention.

FIG. 2, a hydraulically operated level correction device according to a second embodiment.

Referring to these figures, it can be seen that (FIG. 1), the oleopneumatic shock absorber is made up of a tube 1 provided with covers 4, 5, between which is placed fluid tightness joint 6 for rod 3 of piston 2. Tube 1 is capped by a sleeve 9, held by a bell 8, itself held on tube 1 by nut 7 screwed on attachment rod 1a. Sleeve 9 delimits spaces 10 and 11 filled with oil and gas under pressure, respectively. Shoulders 9a, 9b, of sleeve 9 are locked on the tube respectively by bent edge 8a and bulging groove 8b of bell 8 and by nut 7 to give a perfect fluid tightness. Space 10 is connected with the inside of the shock absorber tube by borings 12 extended by grooves 12a. Introduction of the gas under pressure takes place through a hole in sleeve 8 then closed by rivet 18.

The pressure in the shock absorber obviously depends on the pressure of the gas in space 11, and the force on shock absorber rod 3 is proportional to this pressure and its section.

Consequently, this force is used to compensate completely or partially for a variation of load and consequently a variation of the level of a vehicle by modifying, according to the invention, the pressure of the gas in space 11 in proportion. This is obtained by arranging a sliding piston 14, provided with a fluid tightness joint 15, in the closed end of the shock absorber tube and moving said piston 14 with a threaded rod 13 provided with a handle 13a and mounted in the attachment rod 1a to the chassis of the vehicle. Actually, by moving piston 14 downward, the volume of the shock absorber is reduced and the liquid passes into space 10 and causes sleeve 9 to dilate which results in the further compressing of the gas in space 11. As a result, the force of rod 3 consequently increases and the vehicle is again in its normal or almost normal position.

The operation with handle 13a is extremely simple and fast to perform by the owner of the vehicle. In general, adjustment of the shock absorbers will be modified only for the back wheels, whose load variation is greater, and these shock absorbers are easily accessible in the trunk of the vehicle.

In FIG. 2 is shown an oleopneumatic monotube shock absorber with a floating piston 1b and its fluid tightness joint 17 mounted in shock absorber 1 to separate the liquid of the shock absorber in the lower part around piston 2 from the gas under pressure in the upper part. The shock absorber further comprises covers 4, 5 enclosing fluid tightness joint 6 for piston rod 3.

Piston 14 with its fluid tightness joint 15 acts to compress the gases under pressure in the shock absorber by making it be displaced by a fluid under pressure introduced through passage 1b in attachment rod 1a of the shock absorber. The fluid under pressure can come, for example, from a high pressure hydraulic central whose pump is driven by the engine of the vehicle, by causing the liquid to pass in a way known in itself, through a device for detecting the level of the vehicle. But the fluid under pressure can also come from a hand driven pump, sending either the liquid under pressure or gas under pressure into the shock absorber.

A small fluid tight tank can also be provided on attachment rod 1a, filled with liquid gas or dry ice. Communication through passage 1b then being controlled by a cock.

Depending on requirements, the level correction can be partial or complete and in the case of FIG. 1, it is possible to provide markers on threaded rod 13 to indicate the position to be given to it, depending on the load of the vehicle.

It should be noted that the device for correction with a movable piston 14 can be used with any type of oleopneumatic shock absorber even if no separation exists between the liquid of the shock absorber and the liquid.

The applications are very numerous, and it is possible, for example, to provide it on the telescope forks of motorcycles or the suspension rods for the back wheels to obtain a modification of the suspension, depending on the load.

When the level correcting shock absorber according to the invention is made to constitute the fork of a motorcycle, it is possible, because of the considerable length of this element, to house the suspension spring in the shock absorber itself.

In this case, the spring is either arranged between shock absorber piston 2 and floating piston 16, or between a support that is solid with shock absorber rod 3 and another support that is solid with the shock absorber tube.

It is even possible to get along completely without a suspension spring by having the load supported by the gas under pressure above floating piston 16.

I claim:

1. A variable-load shock absorbing suspension device capable of partially or completely suspending a portion of a vehicle on a wheel assembly, the device comprising an oleopneumatic shock absorber having a cylinder and a reciprocable damping piston therein, a rod on said piston extending outwardly of said cylinder through a packed opening provided at one end of said cylinder, a quantity of damping liquid within said cylinder within which said piston reciprocates, a quantity of compressible gaseous fluid separated by a partition from the quantity of damping liquid and exerting pressure on the damping liquid, a control piston disposed for fluid-tight reciprocation within said cylinder and being located at an end opposite said one end of said cylinder in pressure-exerting confining relation to the damping liquid and the gaseous fluid, and means on said cylinder for adjusting the position of said control piston to vary the pressure on the damping liquid and the gaseous fluid to proportionately vary the force of said rod to compensate for variations in load on the vehicle.

2. The device according to claim 1 wherein said control piston is in direct contact with the damping liquid, said partition comprising an elastomeric sleeve capping a portion of said cylinder, a rigid tube surrounding said sleeve and being spaced from said cylinder for supporting said sleeve on said cylinder, the volume determined by the space between said sleeve and said cylinder communicating with the interior of said cylinder, and the volume determined by the space between said sleeve and said tube being occupied by the compressible gaseous fluid.

3. The device according to claim 1, in which both the damping liquid and the gaseous fluid are contained within the shock absorber cylinder, and there is provided a third piston mounted for fluid-tight reciprocation within the cylinder and floating upon the damping liquid and separating the latter from the body of compressible gaseous fluid, and in which said control piston acts directly upon the damping fluid.

4. The device according to claim 1, wherein said adjusting means includes a control rod threaded through an opening in said opposite end of the cylinder, said rod having means on its outer end for manual rotation thereof.

5. The device according to claim 1, wherein said adjusting means includes a fluid conduit at said opposite end for introducing into said cylinder, about the control piston, a fluid under variable degrees of pressure to adjust its position.

* * * * *